United States Patent [19]
Waldeck

[11] 3,988,548
[45] Oct. 26, 1976

[54] DIAL PULSE CORRECTION CIRCUIT FOR TELEPHONE SIGNALING SYSTEM

[75] Inventor: Gary C. Waldeck, Scottsdale, Ariz.

[73] Assignee: GTE Automatic Electric Laboratories Incorporated, Northlake, Ill.

[22] Filed: Dec. 2, 1975

[21] Appl. No.: 636,854

[52] U.S. Cl. .................................... 179/16 EA
[51] Int. Cl.² ................................... H04Q 1/36
[58] Field of Search ........................... 179/16 EA

[56] References Cited
UNITED STATES PATENTS

| | | | |
|---|---|---|---|
| 3,092,691 | 6/1963 | Burns | 179/16 |
| 3,452,220 | 6/1969 | Fritschi | 307/293 |
| 3,504,290 | 3/1970 | Earle | 328/164 |
| 3,544,724 | 12/1970 | Pento | 179/16 |
| 3,659,055 | 4/1972 | Witmore | 179/16 E |
| 3,671,875 | 6/1972 | Pento | 328/129 |
| 3,700,821 | 10/1972 | Savage | 179/16 E |
| 3,772,474 | 11/1973 | Wisotzky | 179/16 EA |
| 3,781,482 | 12/1973 | Wisotzky | 179/16 EA |
| 3,794,755 | 2/1974 | Hicks | 179/16 EA |
| 3,908,091 | 9/1975 | Waldeck | 179/16 EA |

*Primary Examiner*—George G. Stellar
*Attorney, Agent, or Firm*—Leonard R. Cool; Russell A. Cannon

[57] ABSTRACT

Inverted and noninverted representative dial pulse signals are coupled to associated semiconductor diodes which are connected to opposite sides of a first timing capacitor, each side of the first capacitor being connected through a different associated timing resistor to a supply voltage and connected to an input of an associated NOR-gate. The output of each NOR-gate is coupled to an input of the other NOR-gate. A corrected dial pulse signal is the output signal of one NOR-gate. This output signal is also coupled through the series combination of a second timing capacitor and associated timing resistor to the supply voltage and through the second capacitor and an inverter to another input of the one NOR-gate. A corrected dial pulse signal with a corrected break pulse interval is not produced for an input dial pulse signal having a break pulse interval with a duration of less than a first time interval which is set by the first capacitor, an associated resistor, and the threshold level of the one NOR-gate. If the duration of an input break pulse is greater than the first time interval, the one NOR-gate produces a corrected dial pulse signal with a corrected break pulse interval having a pulse duration which is the longer of the duration of the input break pulse and the duration of a second time interval set by the second capacitor and associated timing resistor.

18 Claims, 7 Drawing Figures

| | | $t_1$ | $t_2$ | $t_3$ | $t_4$ |
|---|---|---|---|---|---|
| N1 INPUTS | 67 | 0 | 0 | 0 | 0 |
| | 57 | 10 | 0 | 0 | 0 |
| | 63 | 1 | 10 | 0 | 0 |
| N1 OUT | 61 | 0 | 01 | 1 | 1 |
| | | $t_1$ | $t_2$ | $t_3$ | $t_4$ |
| N2 INPUTS | 61 | 0 | 01 | 1 | 1 |
| | 59 | 0 | 01 | 10 | 0 |
| N2 OUT | 63 | 1 | 10 | 0 | 0 |

DIAL PULSE CORRECTION CIRCUIT FOR TELEPHONE SIGNALING SYSTEM

This invention relates to telephone systems and more particularly to an improved dial pulse correction circuit in a telephone signaling system.

Supervisory signals in a telephone switching system for indicating on-hook and off-hook conditions of a subscriber handset are DC pulses having durations that are typically greater than 100 milliseconds long. In contrast, dial pulse signals comprise a series of break pulse intervals and make pulse intervals, each interval corresponding to a time period when the dial contacts of a calling subscriber handset are open and closed, respectively. Although dial pulse signals are normally produced with a pulse repetition frequency of 10 pulses per second and break and make pulse intervals of 60 milliseconds (ms) and 40 milliseconds (ms), respectively, these pulses may subsequently be modified in time duration by passage through various telephone circuitry and channels. Correction circuitry is therefore employed at various points in telephone systems to make dial pulse signals have minimum durations of break and make pulse intervals and to have a break pulse interval that is of much longer duration than the associated make pulse interval in order to ensure proper operation of central office switching equipment. In a signaling system for a multichannel subscriber carrier telephone system operating between central offices on a common signaling channel, it is generally desirable to be able to recognize dial pulse signals having pulse repetition frequencies between 7.5 and 12.5 pulses per second and to be able to produce corrected dial pulse signals with corrected break pulse intervals that are at least 59 milliseconds long, for example, in response to received dial pulse signals with break pulse intervals having durations that are greater than 17 ms long (which is 22% of a dial pulse period) prior to transmission thereof between central offices. U.S. Pat. No. 3,908,091, dated Sept. 23, 1975, for Dial Pulse Correction Circuit for Telephone Signaling System by Gary C. Waldeck, and which is assigned to the assignee of this invention, discloses circuitry for performing such a function. This invention is an improved dial pulse correction circuit which may be implemented with CMOS integrated circuits.

DESCRIPTION OF PREFERRED EMBODIMENTS

Figure 1:
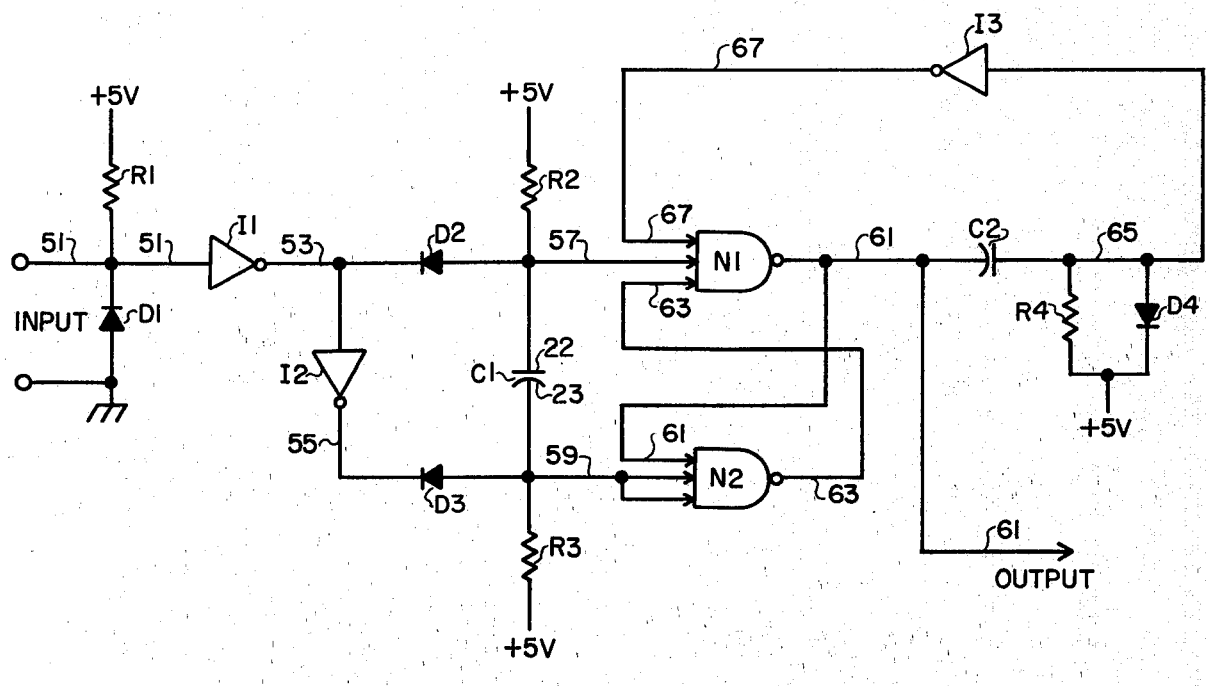
FIG. 1 is a schematic circuit diagram of a dial pulse correction circuit embodying this invention.

Referring now to FIG. 1, a dial pulse correction circuit embodying this invention generally comprises a pair of inverters I1 and I2 which are connected in series; a pair of NOR-gates N1 and N2, each gate having the output thereof electrically connected to an input terminal of the other NOR-gate; a first timing capacitor C1 which is electrically connected across the input terminals 57 and 59 of NOR-gates N1 and N2, respectively; and a second timing capacitor C2. Input dial pulse signals with negative-going break pulses which are to be corrected are applied on line 51 to the input of inverter I1. A semiconductor clamping diode D1 is connected between line 51 and ground. The diode D1 protects inverter I1 by clamping line 51 to ground if the input voltage here goes negative. Line 51 is also connected through a pull-up resistor R1 to a supply potential, e.g., +5 volts.

The terminals 22 and 23 of timing capacitor C1 are connected through associated timing resistors R2 and R3 to the supply voltage, and through associated disconnect diodes D2 and D3 to the outputs of inverters I1 and I2, respectively. Consider that the line 53 and 55 voltages are high and low for a long time period (e.g., prior to time $t_1$ in FIG. 2A) such that diode D2 is cut off, diode D3 conducts through resistor R3 and inverter I2, and capacitor C1 is charged through resistor R2, diode D3, and inverter I2 to the supply voltage with the terminal 22 of the capacitor being positive. When the output voltage 53 of inverter I1 changes to a low logic level at time $t_1$ (the line 55 voltage is now high), the charge on capacitor C1 is effectively reversed such that the line 59 voltage is −5 volts. This causes diode D3 to be cut off and diode D2 to conduct to charge capacitor C1 in the reverse direction through resistor R3, diode D2, and inverter I1. Conversely, when the output voltage 53 of inverter I1 goes high at time $t_3$ (the line 55 voltage is now low), the line 57 voltage drops to −5 volts. This causes diode D2 to be cut off and diode D3 to conduct to charge capacitor C1 in the reverse direction through resistor R2, diode D3, and inverter I2. The time constants associated with capacitor C1 and resistor R2 and with capacitor C1 and resistor R3 are preferably the same values and are selected such that the time delay T1 for capacitor C1 to charge to the threshold levels of the NOR-gates is 17 ms (e.g., see FIG. 3A, waveform 59, times $t_1 - t_2$ and waveform 57, times $t_3 - t_5$), as is described more fully hereinafter.

The output of NOR-gate N1 on line 61, which is also the output of the correction circuit, is connected to one terminal of timing capacitor C2. The other terminal of capacitor C2 is electrically connected through line 65, inverter I3, and line 67 to the third terminal of gate N1. A timing resistor R4 is coupled between line 65 and the supply potential. The second time constant set by capacitor C2 and resistor R4 is selected here so that the time delay T2 for capacitor C2 to charge to the threshold level of NOR-gate N1 is 59 ms (e.g., see FIG. 3A, waveform 65, times $t_5 - t_8$), as is described more fully hereinafter. A clamping diode D4 is also connected between line 65 and the supply potential to protect inverter I3 when this line 65 voltage exceeds +5 volts. The diode D4 clamps the line 65 voltage to +5 volts when capacitor C2 is charged to 5 volts and the line 61 output voltage of the associated NOR-gate N1 goes high, i.e., +5 volts, (e.g., see FIG. 3A, waveform 65, time $t_2$). Thus, the diode D4 effectively removes the voltage spike 81 from the line 65 voltage.

The circuit in FIG. 1 preferably has balanced inputs such that the input impedances to diodes D2 and D3 are the same. This is readily accomplished by employing inverters I1 and I2 which are preferably integrated circuits having matched output impedances. These inverters I1 and I2 may be formed on the same substrate of an integrated circuit package such that the characteristics thereof are closely matched. The timing capacitor C1 and resistors R2 and R3 may also be fabricated on a common substrate. If the inverter I1 is not employed, it is then necessary to match the resistance of R3 to the impedance of the input circuit and the resistance of R2 to the output impedance of I2.

In an embodiment of the invention that was successfully built and tested, gate N2, gate N1, inverter I3, and inverters I1 and I2 comprised portions of CD 4001A, CD 4025A, and CD 4049A CMOS integrated circuit packages manufactured by RCA, and 74L04, respectively, low-power integrated circuit packages manufactured by Texas Instruments. In this correction circuit, the time constants associated with timing capacitors C1 and C2 were selected to provide time delays of 17 and 59 ms, respectively. CMOS integrated circuits were employed here because of the high input impedances thereof and the resultant insignificant current drain at the input nodes thereto at all times.

Figures 2A, 2B:
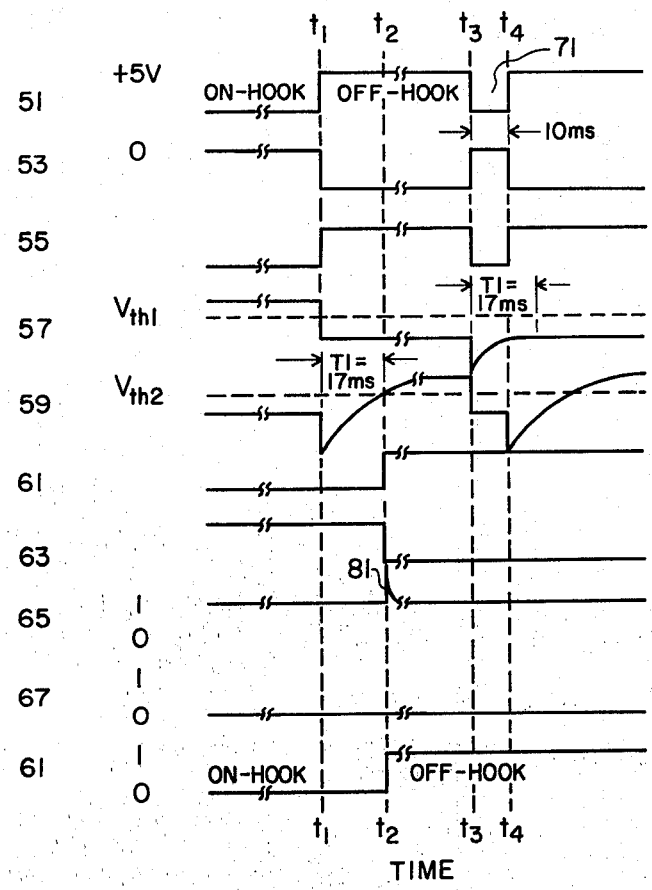
FIGS. 2A, 3A, and 4A are groups of waveforms occurring at various points in the circuit of FIG. 1 and which are useful in explaining and illustrating the operation of this invention. Low (0) and high (1) logic level signals are represented in the waveforms as 0 volts and either the +5 volt supply voltage or the threshold level of an associated gate or inverter, respectively. The waveforms are designated by the same reference numerals as are the lines in FIG. 1 on which they occur. The output waveform 61 is repeated at the bottom of each of these figures for convenience. The waveforms in FIGS. 2A, 3A, and 4A illustrate the operation of the circuit in FIG. 1 for an input dial pulse signal having a break pulse interval with a duration of less than 17 ms; of greater than 17 ms and less than 59 ms; and of greater than 59 ms, respectively. The waveforms are shown generally in a convenient order for explaining the initial conditions of the circuit elements in FIG. 1 for on-hook and off-hook states of a subscriber handset. Once the initial conditions of the circuit elements are understood at time $t_3$, it is really only necessary to refer to the waveforms 57, 59, 65, and the output waveform 61 to understand the operation of the circuit of FIG. 1 and this invention.
FIGS. 2B, 3B, and 4B are tabulations summarizing the operation of the NOR-gates N1 and N2 in FIG. 1. The single numerals 1 and 0 in the columns here indicate logic levels of a signal at a particular instant of time. The double numerals 10 and 01 in the columns indicate the logic level of a signal immediately before and after a particular instant of time.
Figures 3A, 3B:
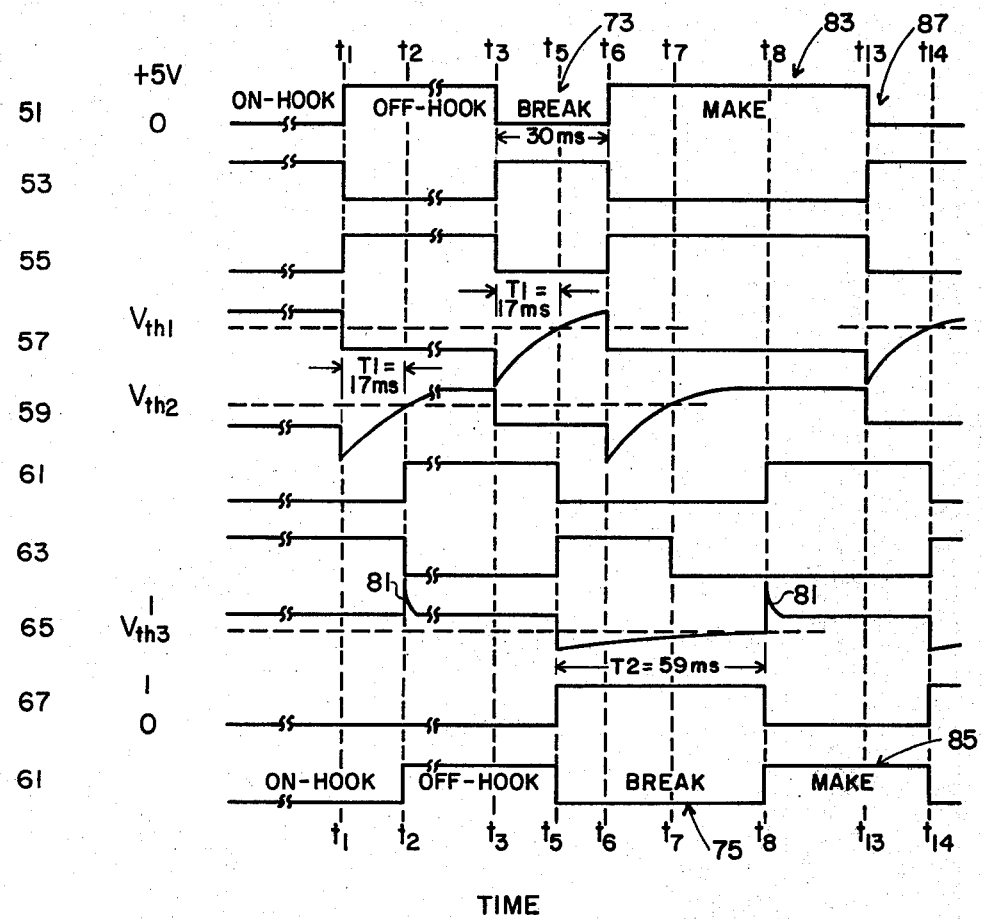
Figures 4A, 4B:
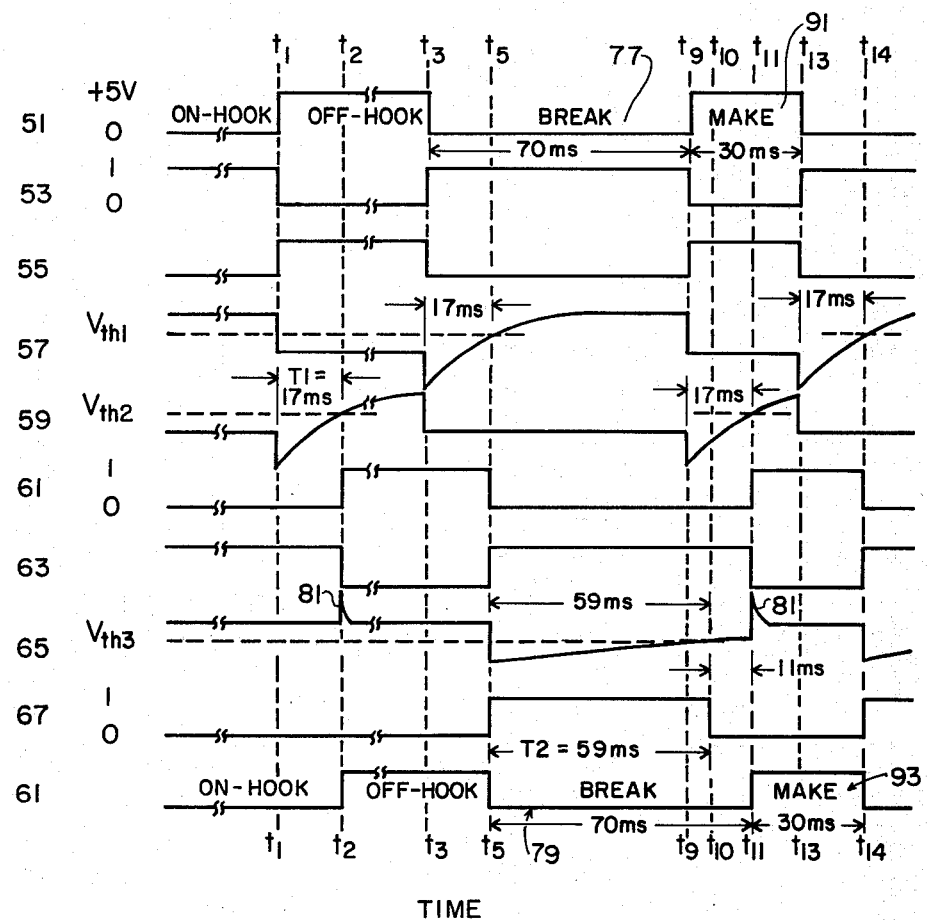

The waveforms in FIGS. 2A, 3A, and 4A illustrate the operation of the circuit in FIG. 1 for a subscriber handset that is on-hook for a long time interval prior to going off hook at time $t_1$. The waveforms 51 do not necessarily have to come directly from the dial contacts of a subscriber handset. They may be either generated or repeated by central office switching equipment. Corresponding waveforms in each of the FIGS. 2A, 3A, and 4A are the same through time $t_3$. Briefly, a break pulse 71 in FIG. 2A having a duration of less than 17 ms in an input dial pulse signal 51 is not reproduced in the corrected dial pulse signal 61. In contrast, if a received dial pulse signal 51 in FIG. 3A includes an uncorrected break pulse 73 with a duration of greater than 17 ms and less than 59 ms, the corrected dial pulse signal 61 has a corrected break pulse 75 of 59 ms duration, although the latter is delayed in time by 17 ms. If a break pulse 77 of an input dial pulse signal 51 in FIG. 4A has a duration of greater than 59 ms, the corresponding corrected break pulse 79 in the corrected dial pulse signal 61 has a duration which is equal to that of the uncorrected break pulse 77. The operation of the NOR-gates N1 and N2 in producing these corrected dial pulse signals is summarized in FIGS. 2B, 3B, and 4B.

Referring now to FIG. 2A, since the input signal 51 is low when the subscriber handset is on hook prior to time $t_1$, the outputs 53 and 55 from the inverters I1 and I2 are high and low, respectively. The high logic level on line 53 causes diode D2 to be cut off, whereas the low logic level on line 55 causes diode D3 to conduct. One conduction path for diode D3 is through resistor R3, the diode D3, and inverter I2. A second conduction path for diode D3 is through resistor R2, capacitor C1, the diode D3, and inverter I2. Conduction of diode D3 causes capacitor C1 to charge to approximately the supply potential such that the input signal 57 to NOR-gate N1 is high prior to time $t_1$. As is well known, whenever any input to a NOR-gate is high, the gate is disabled and the output thereof is low. Thus, the high logic level on line 57 disables NOR-gate N1 such that the output 61 thereof is low and enables the other NOR-gate N2. Since capacitor C1 is charged to the supply potential while diode D3 is conducting prior to time $t_1$, the signal on line 59 is low. This means that all of the inputs 59 and 61 to NOR-gate N2 are low such that the output 63 thereof is high (see FIG. 2B, column $t_1$). As stated previously, the output signal 61 of NOR-gate N1 is low. This causes capacitor C2 to charge through resistor R4 and NOR-gate N1 to the supply voltage such that the signal 65 is high. Since this signal 65 is inverted by the circuit I3, the signal 67 is low.

When the subscriber handset goes off hook at time $t_1$, the input signal 51 goes high to drive diode D3 into cutoff and diode D2 into conduction (the signal 57 goes low) to charge capacitor C1 in the reverse direction (see FIG. 2B, column $t_1$ and row 57). The signal 59 is still low, however, for a time interval T1 = 17 ms after time $t_1$. Although the two input signals 57 and 67 to NOR-gate N1 are now both low, this gate remains disabled since the signal 63 from NOR-gate N2 is still high. After the time interval T1 = 17 ms during which capacitor C1 charges to the threshold level $V_{th2}$ of gate N2, the signal 59 is effectively high at time $t_2$ and disables NOR-gate N2. This causes the signal 63 to be low at time $t_2$ to bias the NOR-gate N1 to change conduction states so that the output 61 thereof and of the circuit goes high. Since the capacitor C2 is already charged to the supply potential, this could cause a voltage spike 81 to occur on line 65 at time $t_2$. The diode D4 is caused to conduct at time $t_2$ by this voltage condition to rapidly discharge capacitor C2 to the supply potential to prevent such a voltage spike actually developing on line 65 and possibly damaging the inverter I3. Since the signal 65 remains high at time $t_2$, the logic level of signal 67 from the inverter I3 is still low.

It will be noted that all of the input signals 57, 63, and 67 to NOR-gate N1 are low during the portion of an off-hook condition that is longer than the time period T1 = 17 ms. It is only necessary therefore to consider the signals 57, 59, and 65 to determine whether a corrected break pulse will be produced in the output signal 61.

The transient pulse 71 in the input signal 51 of FIG. 2A has a duration $t_4 - t_3 = 10$ ms which is less than 17 ms. This pulse 71 at time $t_3$ causes diode D3 to conduct to clamp the signal 59 at a low logic level (see FIG. 2B, column $t_3$). This has no effect on the operation of NOR-gate N2, however, since the signal 61 is high at this time. Conduction of diode D3 at time $t_3$ causes capacitor C1 to charge such that the voltage 57 increases toward the supply potential. The time for capacitor C1 to charge to the threshold level $V_{th1}$ of gate N1, however, is 17 ms, which is longer than the 10 ms duration of the pulse 71. This means that the voltage 57 does not reach a sufficient magnitude to disable NOR-gate N1 prior to termination of the transient pulse 71 at time $t_4$. When the input signal 51 goes high at this time $t_4$, diode D2 conducts to clamp the voltage 57 at a low logic level to ensure that the operation of NOR-gate N1 is unchanged. The capacitor C1 then charges in the reverse direction through the resistor R3, the diode D2, and inverter I1, although this has no effect on the operation of the remainder of the circuit. Reference to waveform 61 reveals that such a transient pulse condition 71, which is effectively a break pulse having a duration of less than 17 ms, is not reproduced in the corrected dial pulse signal 61.

Consider that an input signal 51 has a break pulse 73 therein having a duration $t_6 - t_3 = 30$ ms, for example, which is greater than 17 ms and is less than 59 ms as is shown in FIG. 3A. As was stated in relation to the waveforms of FIG. 2A, although a break pulse at time $t_3$ causes diode D3 to change the signal 59 to a low logic level, NOR-gate N2 remains in the same state since the other input 61 thereto is still high (see FIG. 3B, column $t_3$). Since the break pulse 73 is 30 ms long, capacitor C1 charges through diode D3 for more than 17 ms. When the signal 57 exceeds the treshold level $V_{th1}$ at time $t_5$, NOR-gate N1 is disabled and the output 61 thereof goes low to change the operating state of NOR-gate N2 to make the output 63 thereof high. Since the signal on line 57 is already high, however, the signal 63 has no effect on the operation of gate N1.

The low logic level signal 61 at time $t_5$ also causes the signal 65 to be low such that the third input 67 to gate N1 is also high (see FIG. 3B, column $t_5$). The second timing capacitor C2 then charges toward the supply potential through resistor R4, capacitor C2, and NOR-gate N1. Since it takes 59 ms for capacitor C2 to charge to the threshold level $V_{th3}$ of inverter I3, NOR-gate N1 is disabled for at least a time interval T2 = 59 ms, through time $t_8$, no matter what logic level signals are applied on the input lines 57 and 63. When the break pulse 73 is terminated at time $t_6$, which is prior to time-out of capacitor C2 at time $t_8$, diode D2 again conducts to drive the signal 57 low. This signal 57 has no effect on the operation of gate N1, however, since the inputs 63 and 67 thereto are still high. When the first timing capacitor C1 is charged to the threshold level $V_{th2}$ at time $t_7$, the signal 59 is high to cause NOR-gate N2 to change operating states and the output 63 thereof to be low. Only the input signal 67 to NOR-gate N1 is now high to hold the output 61 thereof low.

When the second timing capacitor C2 is charged to the threshold voltage $V_{th3}$ at time $t_8$, the high logic level signal 65 is inverted by circuit I3 to make the signal 67 low. Since all of the input signals 57, 63, and 67 to NOR-gate N1 are now low, gate N1 changes operating states to make the output signal 61 high at time $t_8$. This terminates the corrected break pulse 75 in waveform 61 which here has a duration of 59 ms.

When the make pulse 83 in the received signal 51 is terminated at time $t_{13}$, this cycle of operation is repeated. The first timing capacitor C1 again charges through diode D3 until the line 57 voltage exceeds the threshold level $V_{th1}$. This disables NOR-gate N1 to make the output 61 thereof low at time $t_{14}$ to terminate the make pulse 85 in the corrected dial pulse signal 61.

The operation of this circuit for the new break pulse 87 is the same as that described previously.

FIG. 4A illustrates the operation of the circuit of FIG. 1 for a received dial pulse 51 having a break pulse 77 with a duration $t_9 - t_3 = 70$ ms, which is greater than 59 ms. Similar operation is defined by some waveforms in FIGS. 3A and 4A to time out of the second capacitor C2 at times $t_8$ and $t_{10}$, respectively. In FIG. 4A, a corrected break pulse 79 is initiated at time $t_5$ which is 17 ms after the start of the input break pulse 77 at time $t_3$. All three of the inputs 57, 63, and 67 to gate N1 are therefore high at time $t_5$ when capacitor C2 begins to charge toward the supply voltage (see FIG. 4B, column $t_5$).

Termination of the input break pulse 77 at time $t_9$, which is prior to time-out of capacitor C2 at time $t_{10}$, causes diode D2 to drive the signal 57 low and to hold the signal 59 low for at least 17 ms. When the charge voltage 65 on capacitor C2 is equal to the threshold voltage $V_{th3}$ at time $t_{10}$, which is prior to time-out of capacitor C1 at time $t_{11}$, the signal 67 goes low. Only the signal 63 from NOR-gate N2 is still high to hold gate N1 disabled.

When capacitor C1 times out at time $t_{11}$ such that the signal 59 is greater than the threshold level $V_{th2}$, NOR-gate N2 is disabled to make the output 63 thereof low. Since all of the three input signals 57, 63, and 67 to NOR-gate N1 are now low, this gate N1 operates to make the signal 61 high to terminate the corrected break pulse 79 in this signal 61 at time $t_{11}$. Thus, a corrected break pulse 79 having a duration which is equal to the duration of the input break pulse 77 is produced when the duration of the latter is greater than 59 ms. Upon termination of the make pulse 91 in waveform 51 at time $t_{13}$, the circuit operates as stated in relation to FIG. 3A to produce a corrected make pulse 93 in waveform 61.

Reference to the waveforms in FIG. 4A reveals that the duration of a corrected break pulse 79 may be made greater than or less than the duration of an input break pulse 77 which is longer than 59 ms by making the resistors R2 and R3 that are associated with the first timing capacitor C1 have different values.

What is claimed is:

1. A dial pulse correction circuit responsive to binary input dial pulse signals with input break pulse intervals which are greater than a first prescribed minimum time interval for producing corrected dial pulse signals with corrected break pulse intervals of at least a second prescribed minimum time interval, comprising:
 first timing means responsive to a binary input dial pulse signal for producing an output signal which changes to one logic level at the end of a third time interval after initiation of an input break pulse which has a duration that is greater than that of the first prescribed time interval, the duration of the third time interval being equal to that of the first time interval, the output signal of said first timing means being of an other logic level prior to generation of the input break pulse;
 second timing means responsive to the binary input dial pulse signal for producing an output signal which is maintained in the other logic level for a fourth time interval after termination of the input break pulse, the output signal of said second timing means changing from the one to the other logic level on generation of the input break pulse and being of the one logic level at the end of the fourth time interval; and logic means having first and second inputs receiving output signals of said first and second timing means, respectively, said logic means being operative for generating a corrected break pulse of the other logic level and of at least a minimum duration that is equal to that of the second time interval when the logic level of the output signal of said first timing means changes to the one logic level when the output signal of said second timing means is of the other logic level and being operative for terminating the corrected break pulse when the output signal of said second timing means is of the one logic level following a time interval measured from generation of the corrected break pulse, the latter time interval having a duration that is at least equal to that of the second time interval.

2. The correction circuit according to claim 1 wherein said logic means comprises first and second NOR function means, each having a first input receiving the output signal of associated first and second timing means, each NOR-function means having a second input receiving the output signal of the other one of said NOR-function means.

3. The correction circuit according to claim 2 wherein said logic means further comprises third timing means electrically connected in series between the output of said first NOR-function means and a third input thereof, said third timing means being operative for maintaining said first NOR-function means operating to produce a corrected break pulse output signal of the other logic level for at least a time interval having a duration equal to that of the second time interval.

4. The correction circuit according to claim 3 including a source of supply voltage; wherein said first timing means comprises a first resistor, first capacitor, a first diode, and a first inverter electrically connected in series in that order between the supply voltage and a first terminal; and including means coupling input dial pulse signals to said first terminal, the common connection of said first capacitor and first resistor being electrically connected to the first input of said first NOR-function means.

5. The correction circuit according to claim 4 wherein said second timing means comprises a second resistor, said first capacitor, and a second diode electrically connected in series in that order between the supply voltage and said first terminal, the common connection of said first capacitor and second resistor being electrically connected to the first input of said second NOR-function means, said first resistor and first capacitor determining the duration of the third time interval and said second resistor and first capacitor determining the duration of the fourth timing interval.

6. The correction circuit according to claim 5 wherein said third timing means comprises a second capacitor, means for electrically connecting said second capacitor in series between the output and the third input of said first NOR-function means, and a third resistor electrically connected between the supply voltage and the side of said second capacitor that is spaced from the output of said first NOR-function means, said second capacitor and third resistor determining the duration of the second time interval.

7. The correction circuit according to claim 6 wherein said coupling means comprises a second inverter coupling inverted dial pulse signals to said first terminal and said connecting means comprises a third inverter coupling inverted signals to the third input of said first NOR-function means, the durations of the third and fourth time intervals both being equal to that of the first time interval.

8. The correction circuit according to claim 7 including a third diode electrically connected in parallel with said third resistor.

9. The correction circuit according to claim 8 including a fourth diode electrically connected between a reference potential and the one side of said second inverter that is spaced from said first terminal.

10. The correction circuit according to claim 9 including a fourth resistor electrically connected between the one side of said second inverter and the supply voltage.

11. A dial pulse correction circuit responsive to binary input dial pulse signals with input break pulse intervals which are greater than a first prescribed time interval for producing corrected dial pulse signals with corrected break pulse intervals of at least a second prescribed minimum time interval, comprising:

a source of supply voltage;
a first resistor and first diode electrically connected in series between said voltage source and a first terminal;
a second resistor and second diode electrically connected in series between said voltage source and a second terminal;
a first timing capacitor electrically connected between the sides of said first and second resistors that are spaced from said voltage source;
first means receiving input dial pulse signals and coupling input dial pulse signals with positive and negative going break pulses to said first and second terminals, respectively;
generation of an input break pulse causing said second diode to conduct to charge said first capacitor through said first resistor to produce a first signal of a logic level 1 at the first junction of said first resistor and first capacitor following a first time interval after initiation of an input break pulse having a duration that is at least equal to that of the first time interval, this logic level 1 signal at said first junction being of a logic level 0 immediately prior to generation of the input break pulse; termination of an input break pulse causing said first diode to conduct to charge said first capacitor through said second resistor to produce a second signal that is maintained a logic level 0 at the second junction of said second resistor and said first capacitor for a third time interval after termination of the input break pulse, the second signal being a logic level 1 prior to generation of the input break pulse and at the end of the third time interval; and
logic means having first and second inputs receiving the first and second signals at said first and second junctions, respectively, for generating a corrected break pulse of a logic level 0 when the logic level of the first signal changes to a logic level 1, the duration of the corrected break pulse being of at least a minimum duration that is equal to that of the second timing interval; said logic means terminating the corrected break pulse when the second signal is a logic level 1 following a time interval measured from generation of the corrected break pulse and having a duration that is at least equal to that of the second time interval.

12. The correction circuit according to claim 11 wherein said logic means comprises first and second NOR-function means, each having a first input receiving the first and second signals, respectively, and having a second input receiving the output signal of the other NOR-function means.

13. The correction circuit according to claim 12 including timing means electrically connected in series between the output and a third input of said first NOR-function means, said timing means being responsive to a logic level 0 output signal from said first NOR-function means for producing a logic level 1 pulse signal having a duration equal to that of the second time interval for holding said first NOR-function means in the same logic state at least throughout this time interval.

14. The correction circuit according to claim 13 wherein said timing means comprises a second capacitor and a first inverter electrically connected in series between the output and the third input of said first NOR-function means and a third resistor electrically connected between said supply voltage source and the side of said second capacitor that is connected to said first inverter, said second capacitor and third resistor determining the duration of said second time interval.

15. The correction circuit according to claim 14 including a third diode electrically connected in parallel with said third resistor.

16. The correction circuit according to claim 14 wherein said first-named means comprises second and third inverters electrically connected in series between an input line and said second terminal, the junction of said second and third inverters being electrically connected to said first terminal.

17. The correction circuit according to claim 16 including a third diode electrically connected between the input line and a reference potential.

18. The correction circuit according to claim 17 including a fourth resistor electrically connected between the input line and said supply voltage source.

* * * * *